No. 678,722. Patented July 16, 1901.
T. A. EDISON.
REVERSIBLE GALVANIC BATTERY.
(Application filed June 20, 1901.)
(No Model.)
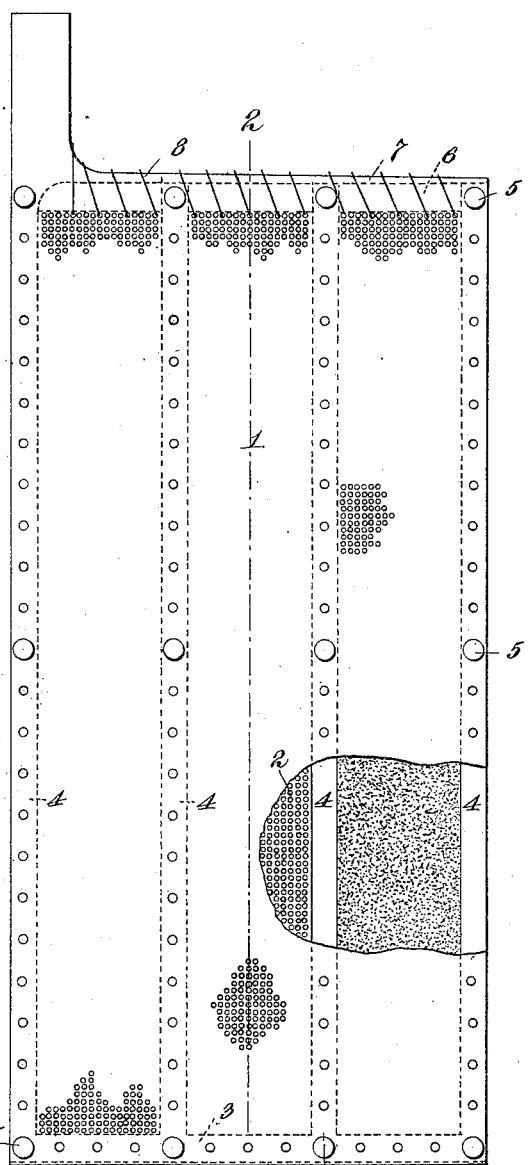
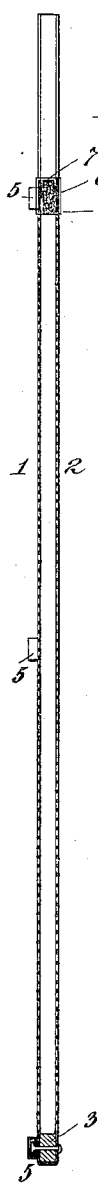
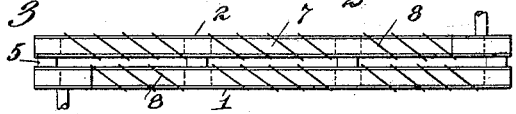
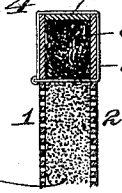
Witnesses:
Jas. F. Coleman
Jno. R. Taylor
Inventor
Thomas A. Edison
by Dyer Edmonds & Dyer
Att'ys.

UNITED STATES PATENT OFFICE.

THOMAS A. EDISON, OF LLEWELLYN PARK, NEW JERSEY.

REVERSIBLE GALVANIC BATTERY.

SPECIFICATION forming part of Letters Patent No. 678,722, dated July 16, 1901.

Original application filed March 1, 1901, Serial No. 49,453. Divided and this application filed June 20, 1901. Serial No. 65,284. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Reversible Galvanic Batteries, (Case No. 1,060,) of which the following is a specification.

My invention relates to improvements in reversible or so-called "storage" batteries; and my object is to produce a reversible galvanic cell of great permanency and of remarkably light weight per unit of energy.

In my application for Letters Patent, filed October 31, 1900, Serial No. 34,994, I describe an improved reversible galvanic cell wherein the metals, cadmium, and copper are employed as the elements in an alkaline electrolyte and by means of which I secured a very permanent cell, one wherein the initial and final states of the electrolyte are the same, and, finally, one which was capable of storing a greater amount of energy per pound of cell than batteries commercially used before that time for the same degree of durability. My present invention is designed to further lighten the weight of the cell in comparison to the stored energy and to deliver the energy to the exterior circuit at a higher rate.

In the alkaline zincate type of battery as commercially used, so far as I know, copper oxid has heretofore been used exclusively as the oxygen-furnishing element when the battery is discharged, the copper being reduced to the metallic state. The only other elements which have been suggested and would be available as substitutes for copper in these batteries have been those lower in the electrolytic series, such as mercury and silver; but so far as I know these metals have not been satisfactorily or commercially utilized on account of the difficulties arising from their application in alkaline electrolytes, as well as because of their expense, especially in regard to silver, which metal possesses the further disadvantage of being quite soluble in the electrolyte when subjected to oxidation. I have sought by a great many experiments for an element or compound capable of being used in an alkaline electrolyte, the heat of formation of whose oxid should be as low or lower than that of oxid of mercury, and in this I have been successful, the result being the discovery of an element for furnishing the oxygen to the oxidizable element on discharge with even greater freedom than oxid of mercury, while at the same time the new element is less expensive, is of less weight, is of greater permanency, and finally is of greater insolubility in the electrolyte. I have also sought by experiment for an element superior to cadmium as the oxidizable element on discharge, with the object in view of further reducing the weight and cost of the cell, and I have discovered an element for the purpose possessing these desirable characteristics. As a result a reversible galvanic cell equipped with the new elements is of great permanence, is relatively light and inexpensive, and is of great power.

The elements are preferably carried or supported by hollow perforated plates, forming receptacles or pockets, which are illustrated in the accompanying drawings, forming part of this specification, and in which—

Figure 1 is a face view of one of the plates, having three pockets or receptacles, showing the front wall partly broken away. Fig. 2 is a section on the line 2 2 of Fig. 1. Fig. 3 is a plan showing two of the plates forming a single combination, and Fig. 4 an enlarged detail section.

In all of the above views corresponding parts are represented by the same numerals of reference.

Each plate is formed with two walls 1 and 2, constructed, preferably, of a single continuous sheet, made, preferably, of very thin sheet-nickel—say about .005 of an inch in thickness—and bent at its bottom around a horizontal frame 3, from which extend the vertical spacing-frames 4 4, to all of which frames the sheet is secured by means of nickel rivets, as shown, to form a strong rigid hollow plate, with pockets or receptacles between the vertical frames 4 4. The walls 1 and 2 of the plate, as shown, are perforated with small holes arranged very closely together and each about .015 of an inch in diameter. I prefer to use nickel in the construction of the plates, since that metal is not oxidizable by electric oxidation in an alkaline solution. Iron, on the other hand, is slightly oxidized under these conditions and is not so desirable; but if very carefully and perfectly plated with nickel it may be used satisfactorily for the construction of either the plates or the frames. Obviously the frames 3 and 4 may be, and in some instances preferably are, constructed of hard rubber or other inert material, to which the perforated sheet is riveted, as explained. Secured to one or both of the sides of the plate are a number of insulated spacing-blocks 5 5 to prevent adjacent plates from touching when immersed in the electrolyte.

In the manufacture of my new oxidizable element for use in a reversible galvanic cell I first preferably take monosulfid of iron and reduce it by a crushing operation until the particles thereof may be passed through a screen having about forty thousand openings per square inch, and I intimately mix about eight parts, by weight, of the powdered monosulfid with about two parts, by weight, of flake graphite of a size considerably larger than the perforations in the walls of the pockets or receptacles. Flake graphite being exceedingly thin and of large area gives an extensive conducting-surface in proportion to its bulk and weight. This mixture is then moistened with a twenty-per-cent. solution of potassic hydroxid, and the dampened mass is packed into the pockets or receptacles of the proper plates by a suitable tamping-tool. Owing to the want of flexibility of the graphite, the mixture packs to a hard porous mass. The effect of electrolytic gasing therefore does not disintegrate the mass as a whole when properly compressed. After each pocket or receptacle has been tightly packed with the mass almost to its top a wad of asbestos fiber 6, about a quarter of an inch in thickness, is introduced into the pocket or receptacle above the mass, and on top of this packing is placed a strip of sheet-nickel 7, entirely covering the asbestos and filling the mouth of the pocket, which strip is permanently secured in position by nickel wires 8, threaded through the openings near the top of the pocket, as shown particularly in Fig. 2. The element thus formed is subjected to electrolytic oxidization in a solution of potassic hydroxid, whereby sulfur will be set free and combining with the alkali forms a sulfid of potassium, which diffuses out of the mass, while the iron is converted to a ferrous oxid thereof. This diffusion of the alkaline sulfid out of the plate is hastened and facilitated by subjecting the contents of the plate to alternate oxidization and reduction by alternately reversing the oxidizing-current, and by several of these operations the whole of the sulfur will be eliminated and the element will be ready for use after the iron has been reduced to the metallic state. Since iron does not decompose water, there will obviously be no local action between it and the graphite. The oxid formed from the sulfid increases in bulk and being intermediately mixed with the graphite produces considerable pressure on the walls of the plate, which prevents any disturbance of the initial state of the mass even when it is subjected to strong gasing within the pores by overcharging the element electrically. The object of using the monosulfid is to secure the greatest amount of iron oxid in the smallest space and in a form capable of being reduced to the metallic state electrolytically.

My attempts to utilize iron as the oxidizable element in an alkaline reversible battery were for a long time frustrated by the facts, determined only after exhaustive experiments, that dried oxids of iron were not reducible to any extent by the current; that spongy iron reduced by hydrogen from different iron salts was not oxidizable to any considerable extent by the current; that the hydrates of iron were very bulky and difficult of use without drying, which operation effected some obscure change therein to render them nearly inert in the presence of the reducing current; that bulky ferric oxid was not capable of any considerable reduction by the current, and, finally, that ferrous oxid, though easily reducible, was very difficult to prepare on account of atmospheric oxidation. The formation of the ferrous oxid, in the first instance, within the pockets or receptacles did away with the objections due to the bulk of the hydrates, while the oxid thus formed is perfectly reducible by the current. Instead of forming the oxid in this way by oxidizing the monosulfid in an alkaline solution, it will be obvious that salts of iron, like ferrous chlorid, may be packed with the graphite and when placed in an alkaline solution form chlorid of the alkali and ferrous oxid of iron, the alkaline chlorid diffusing out of the mass. The results, however, are not so good as when the sulfid of iron is used, since the quantity of finely-divided iron produced thereby is considerably less and is also less porous, offering, therefore, a reduced opportunity for the solution to penetrate the mass and lowering in consequence its current-conducting capacity. Metallic iron, even when finely divided, as produced by electrolytic reduction, does not of itself oxidize in solutions of the fixed alkalies, and the oxid of iron is not appreciably soluble. Compact, dense, or non-porous iron—i. e., iron having relatively large particles—when subjected to a powerful electrolytic oxidation forms a small quantity of a soluble ferrate of the alkali and dissolves in the electrolyte. On the other hand, finely-divided iron obtained as described when subjected to electrolytic oxidation does not form a soluble ferrate, but is converted into the insoluble ferrous oxid. My improved oxidizable element is therefore absolutely permanent, so that in the operation of the battery the electrolyte is not changed at any stage of the working, and absolutely no deterioration of the iron element takes place.

Having described the advantages and characteristics of and the preferred manner of making the oxidizable element, reference will now be made to the preferred oxygen furnishing or storing element of the cell.

I have discovered by experiment that the lower oxids of nickel and cobalt when in contact with a conductor in an alkaline solution can be almost wholly raised from this lower to a higher stage of oxidation electrolytically than is possible by chemical means and that these higher oxids revert to a lower stage by reduction with extreme ease, and availing myself of this fact I have constructed an oxygen-storing element capable of great capacity, of light weight, and of high permanence. Neither the oxid of nickel nor of cobalt is appreciably soluble in an alkaline electrolyte, and both nickel and cobalt give nearly the same voltage in use; but since nickel is less expensive than cobalt I prefer to use the former element for the purpose.

The preferred process of making the oxygen-storing element consists in first precipitating either the monoxid or black hydrated dioxid of the metal—say nickel—in the usual way, washing the precipitate free from the products of the reaction, filtering off the liquid, and drying off the precipitate. The resulting dried hydrated oxid is then powdered very fine and is ready for use. Either oxid may be used with the same results. The process above outlined applies to cobalt as well as to nickel. About seven parts, by weight, of the finely-powdered hydrate and three parts, by weight, of flake graphite are then intimately mixed and moistened with a small quantity of a strong solution of potassic hydroxid, so as to dampen the mass, which is then inserted in the pockets or receptacles of the proper plates in small quantities at a time and thoroughly tamped at each accession. Finally the mass is covered with a layer of asbestos, held in place by a plate of nickel secured in position by nickel wires, as I have described in explaining the make-up of the oxidizable element. The plates the pockets of which are thus supplied with the mixture of the hydrated oxid and graphite are then immersed in a solution of potassic hydroxid in water and subjected for a considerable time to an oxidizing-current of about fifty milliamperes per square inch of surface, during which the oxid is either raised to a higher stage of oxidation than the black oxid ($Ni_2O_3$) or else acts as an absorber of oxygen in some manner unknown to me. Whatever the action may be, the oxid so treated acts as a most efficient oxygen-storing element for commercial use in a galvanic battery.

The object of employing graphite, which is not affected by electrolytic oxidation, is to offer a great extent of surface against which the whole of the oxid is in contact, a large conducting-surface being necessary, since the electrolytic reduction and oxidation for practical purposes only extend a small distance from the conducting-surface against which the oxid is in contact. This is admirably effected by the use of graphite in its micaceous form, the proportions indicated being such as to practically insure that the electrolytic action need not penetrate a greater distance from the contact-surface than the thickness of a single particle of the powdered oxid. Furthermore, there is no local action between the nickel or cobalt oxids and the graphite.

The reason why nickel hydrate is preferably used instead of other compounds of nickel is that the metal itself when finally divided (as obtained by reducing a nickel compound by hydrogen or electrolysis) is not oxidizable to any considerable extent when subjected to electrolytic oxidation in an alkaline solution. The sulfid of nickel is not decomposed by electrolysis under the conditions of battery-work, and the sulfid of cobalt only imperfectly. Hence the hydrates are the most available compounds for use, since they do not become inert to the same extent as hydrates of the oxids of iron after drying, they are easily prepared, and by absorbing the solution they swell within the pockets or receptacles, so as to insure intimate contact and stability. During the charging of the cell the absorption of oxygen by the oxid of nickel or cobalt causes the oxid to further swell and bulge the pockets or receptacles outwardly, and on discharge a proportionate contraction takes place. In order that the walls of the pockets or receptacles may always maintain the desirable intimate contact with the active material, the pockets are, as stated, made of some highly-elastic metal, such as hard-rolled sheet-nickel, so that at each contraction of the mass the pocket-walls will by their elasticity keep in contact therewith.

Having constructed the two elements of the battery as above explained, they are preferably utilized together in a solution of twenty-five per cent. of potassic hydroxid in water and the cell is ready for use, and when charged the iron is in the metallic form and the nickel or cobalt oxid is raised to the superperoxid stage described.

Owing to several obscure reactions which take place when the battery is discharged, and also to a change of resistance within the electrodes, the voltage is variable; but the average voltage over the whole discharge is about one volt, rising as high as 1.32 volts, and sometimes higher, when freshly charged.

My improved battery can be overcharged, fully discharged, or even reversed and charged in the opposite direction without any injury. Overgassing does not disturb the initial state of the materials in the pockets, all the ingredients are insoluble, the supporting-plates are unattacked by electrolytic oxidation, and the whole operation is independent of the strength of the solution, so that the battery is of great permanence, while at the same time more energy will be stored per unit of weight than with any permanent practical combination heretofore suggested.

I have constructed a battery as above described which gives an available storage capacity of one-horse-power hour for seventy-three pounds weight; but it may be made lighter without destroying its permanent character.

The specific magnetic metals are iron, nickel, and cobalt. By the expression "oxid of a specific magnetic metal other than iron" as employed in my claims I mean oxid of nickel, oxid of cobalt, or a combination of such oxids. By the use of that expression it is my purpose to embrace and include generically both of these utilized oxids.

I do not claim herein the new depolarizer *per se* comprising an electrolytically-active oxid of nickel or cobalt, nor do I claim herein, broadly, such depolarizer when used in a battery of the improved type invented by me, wherein the electrolyte remains unchanged at all times and wherein both the active materials are insoluble in all conditions of use, nor do I claim herein such a depolarizer, broadly, in combination with any suitable oxidizable materials. In my present application I claim the new oxidizable element *per se* and in combination with the new depolarizer. Claims, first, on the new depolarizer *per se;* secondly, on such depolarizer when used in a battery of the new type invented by me, and, finally, on such depolarizer in combination with any suitable oxidizable element are made in my application for Letters Patent filed on even date herewith (Case No. 1,061) as a division of my application filed March 1, 1901, Serial No. 49,453, of which the present case is also a division. Claims on an electrolytically-active oxid of cobalt used as a depolarizer are made in my application filed March 1, 1901, Serial No. 49,452.

Having now described my invention, what I claim as new, and desire to secure by Letters Patent, is as follows:

1. An active oxidizable element for an alkaline reversible galvanic battery, comprising a conducting-support and electrolytically-active, finely-divided iron carried thereby and capable of being oxidized on discharging, substantially as set forth.

2. An active oxidizable element for a reversible galvanic battery, comprising a conducting-support and a mixture of flake-like inert conducting material and electrolytically-active, finely-divided iron carried thereby capable of being oxidized on discharging, substantially as set forth.

3. An active oxidizable element for a reversible galvanic battery, comprising a conducting-support and a mixture of flake-graphite and electrolytically-active, finely-divided iron carried thereby capable of being oxidized on discharging, substantially as set forth.

4. An active deoxidizable element for an alkaline reversible galvanic battery, comprising a conducting-support and finely-divided ferrous oxid carried thereby and capable of being deoxidized on charging, substantially as set forth.

5. An active deoxidizable element for a reversible galvanic battery, comprising a conducting-support and a mixture of flake-like inert conducting material and finely-divided ferrous oxid carried thereby capable of being deoxidized on charging, substantially as set forth.

6. An active deoxidizable element for a reversible galvanic battery, comprising a conducting-support and a mixture of flake-graphite and finely-divided ferrous oxid carried thereby capable of being deoxidized on charging, substantially as set forth.

7. An active deoxidizable element for an alkaline reversible galvanic battery, comprising a conducting-support and an oxid of iron carried thereby electrolytically reducible to the metallic state upon charging, substantially as set forth.

8. An active deoxidizable element for a reversible galvanic battery, comprising a conducting-support and a mixture of flake-like inert conducting material and an oxid of iron carried thereby electrolytically reducible to the metallic state upon charging, substantially as set forth.

9. An active deoxidizable element for a reversible galvanic battery, comprising a conducting-support and a mixture of flake-graphite and an oxid of iron carried thereby electrolytically reducible to the metallic state upon charging, substantially as set forth.

10. In a reversible galvanic battery, the combination of an electrolyte which remains unchanged during all conditions of working, and two elements therein insoluble in such electrolyte, the oxidizable element having for its active material electrolytically-active, finely-divided iron, substantially as set forth.

11. In a reversible galvanic battery, an alkaline electrolyte, a conducting-support carrying finely-divided iron when charged, and another conducting-support carrying an oxid of a specific magnetic metal other than iron and capable of furnishing oxygen for the oxidation of the iron on discharge, substantially as set forth.

12. In a reversible galvanic battery, an alkaline electrolyte, a conducting-support carrying finely-divided oxid of iron when discharged, and another conducting-support carrying an oxid of a specific magnetic metal other than iron and capable of storing oxygen on charging, substantially as set forth.

13. In a reversible galvanic battery, an alkaline electrolyte, a conducting-support carrying finely-divided iron when charged, another conducting-support carrying an oxid of a specific magnetic metal other than iron and capable of furnishing oxygen for the oxidation of the iron on discharge, and an inert conducting material intimately mixed with said oxid, substantially as set forth.

14. In a reversible galvanic battery, an alkaline electrolyte, a conducting-support carrying finely-divided iron when charged, another conducting-support carrying an oxid of a specific magnetic metal other than iron and capable of furnishing oxygen for the oxidation of the iron on discharge, and flake-graphite intimately mixed with said oxid, substantially as set forth.

15. In a reversible galvanic battery, an alkaline electrolyte, a conducting-support carrying finely-divided iron when charged, an inert conducting material intimately mixed with said finely-divided iron, another conducting-support carrying an oxid of a specific magnetic metal other than iron capable of furnishing oxygen for the oxidation of the iron on discharge, and an inert conducting material mixed with said oxid, substantially as set forth.

16. In a reversible galvanic battery, an alkaline electrolyte, a conducting-support carrying finely-divided iron when charged, flake-graphite intimately mixed with said finely-divided iron, another conducting-support carrying an oxid of a specific magnetic metal other than iron capable of furnishing oxygen for the oxidation of the iron on discharge and flake-graphite mixed with said oxid, substantially as set forth.

17. In a reversible galvanic battery, an alkaline electrolyte, a conducting-support carrying finely-divided iron when charged, and another conducting-support carrying oxid of nickel capable of furnishing oxygen for the oxidation of the iron on discharge, substantially as set forth.

18. In a reversible galvanic battery, an alkaline electrolyte, a conducting-support carrying finely-divided oxid of iron when discharged, and another conducting-support carrying an oxid of nickel, substantially as set forth.

19. In a reversible galvanic battery, an alkaline electrolyte, a conducting-support carrying finely-divided iron when charged, and another conducting-support carrying oxid of nickel having when charged electrolytically more oxygen than $Ni_2O_3$, substantially as set forth.

20. In a reversible galvanic battery, an alkaline electrolyte, a conducting-support carrying finely-divided iron when charged, and another conducting-support carrying a hydrated oxid of nickel, substantially as set forth.

21. In a reversible galvanic battery, an alkaline electrolyte, a conducting-support carrying finely-divided iron when charged, another conducting-support carrying oxid of nickel capable of furnishing oxygen for the oxidation of the iron on discharge, and flake-graphite intimately mixed with said oxid, substantially as set forth.

22. In a reversible galvanic battery, an alkaline electrolyte, a conducting-support carrying finely-divided oxid of iron when discharged, another conducting-support carrying an oxid of nickel, and flake-graphite intimately mixed with said oxid, substantially as set forth.

23. In a reversible galvanic battery, an alkaline electrolyte, a conducting-support carrying finely-divided iron when charged, another conducting-support carrying oxid of nickel having when charged electrolytically more oxygen than $Ni_2O_3$, and flake-graphite intimately mixed with said oxid, substantially as set forth.

24. In a reversible galvanic battery, an alkaline electrolyte, a conducting-support carrying finely-divided iron when charged, another conducting-support carrying a hydrated oxid of nickel, and flake-graphite intimately mixed with said oxid, substantially as set forth.

25. In a reversible galvanic battery, an alkaline electrolyte, a conducting-support carrying finely-divided iron when charged, another conducting-support comprising a receptacle having elastic walls, and an oxid of a specific magnetic metal other than iron carried within said receptacle and engaged by the walls thereof with an elastic pressure, said oxid being capable of furnishing oxygen for the oxidation of the iron on discharge, substantially as set forth.

26. In a reversible galvanic battery, an alkaline electrolyte, a conducting-support carrying finely-divided oxid of iron when discharged, another conducting-support comprising a receptacle having elastic walls, and an oxid of a specific magnetic metal other than iron carried within said receptacle and engaged by the walls with an elastic pressure and capable of storing oxygen on charging, substantially as set forth.

This specification signed and witnessed this 17th day of June, 1901.

THOS. A. EDISON.

Witnesses:
FRANK L. DYER,
GERTRUDE J. WILLIAMS.